United States Patent
Stryzhakova et al.

(10) Patent No.: US 10,157,713 B2
(45) Date of Patent: Dec. 18, 2018

(54) ELECTROLYTE FOR AN ELECTROCHEMICAL DOUBLE LAYER CAPACITOR, AND AN ELECTROCHEMICAL DOUBLE LAYER CAPACITOR USING THE SUCH

(71) Applicant: YUNASKO, Ltd., London (GB)

(72) Inventors: Natalia Stryzhakova, Kiev (UA); Sergii Zelinskyi, Sophiivska Borshchagivka (UA); Dmytro Tretyakov, Kiev (UA); Yurii Maletin, Kiev (UA)

(73) Assignee: YUNASKO, Ltd., London (GB)

( * ) Notice: Subject to any disclaimer, the term of this patent is extended or adjusted under 35 U.S.C. 154(b) by 0 days.

(21) Appl. No.: 15/361,600

(22) Filed: Nov. 28, 2016

(65) Prior Publication Data
US 2017/0169960 A1    Jun. 15, 2017

Related U.S. Application Data (60) Provisional application No. 62/267,061, filed on Dec. 14, 2015.

(51) Int. Cl.
*H01G 11/62* (2013.01)
*H01G 11/60* (2013.01)
*H01G 11/32* (2013.01)

(52) U.S. Cl.
CPC .............. *H01G 11/62* (2013.01); *H01G 11/60* (2013.01); *H01G 11/32* (2013.01); *Y02E 60/13* (2013.01)

(58) Field of Classification Search
CPC ........ H01G 11/04; H01G 11/28; H01G 11/32; H01G 11/42; H01G 11/66; H01G 11/56; H01G 11/68
See application file for complete search history.

(56) References Cited

U.S. PATENT DOCUMENTS 5,587,871 A * 12/1996 Ue .................. H01G 9/022
                                              252/62.2
7,314,514 B2 * 1/2008 Drummond ......... H01G 9/038
                                              106/311

(Continued)

FOREIGN PATENT DOCUMENTS

JP    4908236 B    7/2008
JP    2011077376 A    4/2011

OTHER PUBLICATIONS

B. E. Conway. Electrochemical Supercapacitors: Scientific Fundamentals and Technological Applications. New York: Kluwer-Plenum Press, 1999.

(Continued)

*Primary Examiner* — Nguyen T Ha
(74) *Attorney, Agent, or Firm* — Max Kaganov, PA (57) ABSTRACT

An electrolyte for an electrochemical double layer capacitor and an EDLC utilizing such an electrolyte are disclosed. The electrolyte can include a solution of an organic salt or a combination of organic salts, the salts including cations and anions, and a single organic solvent or a mixture of organic solvents, wherein the electrolyte has a boiling point above 100° C., electrochemical stability at voltages between 2.7 V, and a viscosity below 2 mPa·s at a temperature of 100° C. The electrolyte may contain an organic solvent or a mixture of organic solvents having boiling points above 100° C. and melting points below 0° C.

18 Claims, 4 Drawing Sheets

(56) References Cited

U.S. PATENT DOCUMENTS

| | | |
|---|---|---|
| 8,760,851 B2 | 6/2014 | Signorelli et al. |
| 8,871,974 B2 * | 10/2014 | Muraishi ............... C07F 9/5463 564/14 |
| 2002/0018938 A1 * | 2/2002 | Takeuchi ................ C07C 69/96 429/317 |
| 2004/0199015 A1 * | 10/2004 | Yuyama ................. B01D 17/06 564/292 |
| 2005/0014070 A1 * | 1/2005 | Palanisamy ............ H01G 9/022 429/326 |
| 2008/0138704 A1 * | 6/2008 | Mizuta ................... H01G 9/035 429/203 |
| 2012/0044614 A1 | 2/2012 | Hommo et al. |
| 2014/0098466 A1 | 4/2014 | Bilyk et al. |

OTHER PUBLICATIONS

J. Power Sources, 2014, v.265, p. 309-316. Xuewen Yu, Dianbo Ruan, Changcheng Wu, Jing Wang, Zhiqiang Shi.

* cited by examiner

ELECTROLYTE FOR AN ELECTROCHEMICAL DOUBLE LAYER CAPACITOR, AND AN ELECTROCHEMICAL DOUBLE LAYER CAPACITOR USING THE SUCH

CROSS-REFERENCE TO RELATED APPLICATIONS

This application claims priority to U.S. Provisional Patent Application Ser. No. 62/267,061, filed on Dec. 14, 2015 and entitled "ELECTROLYTE FOR AN ELECTROCHEMICAL DOUBLE LAYER CAPACITOR, AND AN ELECTROCHEMICAL DOUBLE LAYER CAPACITOR USING THE SUCH", the contents of which are incorporated herein in their entirety by reference.

FIELD OF THE INVENTION

The present teachings relate, in general, to energy storage devices, and more particularly, to electrolytes for electrochemical double layer capacitors (EDLC). Such capacitors, also known as supercapacitors or ultracapacitors, have broad utility, for example in stop-and-start or kinetic energy recovery systems in hybrid vehicles, pitch blade control in windmills, etc.

BACKGROUND

A typical EDLC comprises two electrodes made of a nanoporous carbon material and interleaved with a porous dielectric film (separator). The entire porous system is impregnated with an electrolyte (in most cases, an aprotic, organic electrolyte) and hermetically sealed with current leads protruding out of the sealed case. EDLC devices based on most commonly used acetonitrile electrolytes can effectively operate at relatively low temperatures, with their upper temperature limit being 65-70° C. This is considered to be a drawback, because the upper temperature limit (e.g., for the applications mentioned above) should be increased up to about 100° C., so as to allow the EDLC to be disposed in proximity to, for example, an engine, or to be safely used in high-temperature environments. Moreover, the working voltage of 2.7-2.85 V, which is typical of most commercially available EDLC devices, should not be decreased at the increased temperatures so as not to lose the EDLC energy and power densities, which are both proportional to the square of the voltage.

In many cases, ionic liquids are considered as electrolytes for high-temperature/high-voltage EDLC devices; however, the high cost, limited availability and high viscosity of ionic liquids present drawbacks that prevent their practical use in EDLC technology.

Accordingly, there is a need to develop high-temperature electrolytes based on organic solvents, having low melting points, high boiling points and being capable of providing a high electrochemical stability and, correspondingly, a high working voltage for EDLC devices utilizing the selected electrolytes. However, an increase in the boiling point of a solvent often entails an increase in its viscosity and melting point, thus reducing the EDLC power capability and efficiency, as well as limiting its low operating temperature limit. For example, sulfolane, which has a fairly high boiling point of 285° C., has a melting point at 27.5° C. and a rather high viscosity of about 10 mPa·s near the melting point, thereby resulting in a low conductivity of electrolytes based on this solvent. On the other hand, most of the low-viscosity solvents have a boiling point far below 100° C., e.g., 81.6° C. for acetonitrile, the most popular solvent in EDLC technology due to its very low viscosity of about 0.35 mPa·s and, correspondingly, fairly high electrolyte conductivity at room temperature.

Another important issue that we have faced when selecting and optimizing the electrolytes for EDLC applications is the significant lowering of their electrochemical stability, and, consequently, a decrease of the EDLC working voltage with an increase in temperature. For example, sulfolane, mixtures of sulfolane with other sulfones and propylene carbonate and its mixtures with other carbonates tested in our lab demonstrated a decrease of the working voltage to 2.1-2.3 V if the temperature increased to 100° C. Unfortunately, the electrochemical stability of an electrolyte cannot be predicted a priori based on known properties of solvents and salts and so should be examined for each specific electrolyte.

SUMMARY

The aim of the present teachings is to improve EDLC performance at high temperatures up to and above 100° C. by providing an electrolyte composition demonstrating high conductivity and good electrochemical stability at said temperatures.

In some aspects, the present teachings provide for an electrolyte for an electrochemical double-layer capacitor. The electrolyte can include a solution of an organic salt or a combination of organic salts, the salts including cations and anions, and a single organic solvent or a mixture of organic solvents, wherein the electrolyte has a boiling point above 100° C., electrochemical stability at voltages no less than 2.7 V, and a viscosity below 2 mPa·s at a temperature of 100° C.

The electrolyte may contain an organic solvent or a mixture of organic solvents having boiling points above 100° C. The melting point of the organic solvent or the mixture of organic solvents may be below 0° C. The mixture of organic solvents may include benzonitrile, as well as another nitrile derivative as a co-solvent, which may be selected from the group including propionitrile, butyronitrile and 3-methoxy-propionitrile. The ratio of benzonitrile to the co-solvent may be between 97:3 and 70:30, by mass. To form a conductive electrolyte, a salt or mixture of salts is dissolved in said organic solvent or in said mixture of solvents. The cations of the organic salts may be selected from the group of cations having a structure that includes: a) a central ionized nitrogen atom surrounded by four alkyl groups, wherein at least three of the alkyl groups have 4 carbon atoms; or b) a central ionized nitrogen atom that is a common element in 5- or 6-atom spiro-cyclic compounds. Exemplary cations of the organic salts may be selected from the group including tetrabutylammonium (TBA), tributylmethylammonium (TBMA), 1,1'-spiro-bipyrrolidinium ($SBP_5$) and 1,1'-spiro-bipyridinium ($SBP_6$). Exemplary salts may be selected from the group including tetrabutylammonium tetrafluoroborate ($TBABF_4$), 1,1'-spiro-bipyrrolidinium tetrafluoroborate ($SBP_5BF_4$), tributylmethylammonium bis(trifluoromethane)sulphonimide (TBMATFSI), and 1,1'-spiro-bipyridinium tetrafluoroborate ($SBP_6BF_4$). Either a single salt of this group or any binary combination of the salts in any weight ratio thereof may be used to form the electrolyte. The concentration of the organic salt or combination of the salts in the electrolyte may be between 15% and 35%, by mass.

In some aspects, the present teachings provide for an electrochemical double-layer capacitor for applications at temperatures up to 100° C. The electrochemical double-layer capacitor can include a housing, a positive electrode and a negative electrode, and a separator. Each electrode includes a nanoporous carbon material and is impregnated by an electrolyte. The electrodes are sealed inside the housing and spaced apart by the separator. The electrolyte can include a solution of an organic salt or a combination of organic salts, with the salts including cations and anions, wherein the electrolyte has a boiling point above 100° C., electrochemical stability at a voltage no less than 2.7 V at 100° C. and a viscosity below 2 mPa·s at 100° C. The organic solvent or the mixture of organic solvents may have a boiling point above 100° C. and a melting point below 0° C. The mixture of organic solvents may include benzonitrile and another nitrile derivative as a co-solvent, which may be selected from the group including propionitrile, butyronitrile and 3-methoxy-propionitrile. The ratio of the benzonitrile to the co-solvent may be between 97:3 and 70:30, by mass. The cations of the organic salts may be selected from the group of cations having a structure that includes: a) a central ionized nitrogen atom surrounded by four alkyl groups, wherein at least three of the alkyl groups have 4 carbon atoms; or b) a central ionized nitrogen atom that is a common element in 5- or 6-atom spiro-cyclic compounds. Exemplary cations of the organic salts may be selected from the group comprising tetrabutylammonium (TBA), tributyl-methylammonium (TBMA), 1,1'-spiro-bipyrrolidinium ($SBP_5$) and 1,1'-spiro-bipyridinium ($SBP_6$). Exemplary organic salts may be selected from the group comprising tetrabutylammonium tetrafluoroborate ($TBABF_4$), 1,1'-spiro-bipyrrolidinium tetrafluoroborate ($SBP_5BF_4$), tributyl-methylammonium bis(trifluoromethane)sulphonimide (TB-MATFSI), and 1,1'-spiro-bipyridinium tetrafluoroborate ($SBP_6BF_4$) as either a single salt of this group or any binary combination thereof in any weight ratio. The concentration of the organic salt or combination of the salts in the electrolyte may be between 15% and 35%, by mass.

BRIEF DESCRIPTION OF THE DRAWINGS

The present teachings are illustratively shown and described with reference to the accompanying drawings, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

In one aspect, the present teachings provide an electrolyte for an electrochemical double-layer capacitor for applications at high temperatures up to 100° C., the electrolyte including a solution of an organic salt or a combination of organic salts, the salts including cations and anions, wherein the electrolyte has a melting point below 0° C., a boiling point above 100° C., electrochemical stability at a voltage of no less than 2.7 V at 100° C., and viscosity below 2 mPa·s at least in the temperature range from 0° C. to 100° C. As used herein, the term "high temperatures" means temperatures including and above 70° C.

In order to extend the range of working temperatures of the EDLC from below 0° C. up to 100° C.—in addition to the provisions of the electrolyte solvent melting point being below 0° C. and boiling point being above 100° C.—the electrolyte must have electrochemical stability at a voltage of no less than 2.7 V in the temperature range from 0° C. to 100° C. The electrolyte is to be not only in a liquid phase at 100° C. but must also provide for electrochemical stability at voltage no less than 2.7 V, as well as sufficient mobility of ions of the salt(s) dissolved in the solvent(s) so as to not decrease the electrolyte conductivity. Furthermore, the electrolyte may have electrochemical stability at voltages between 2.4 V and 3.0 V at different temperatures; for example, at 3.0 V, the electrolyte may have electrochemical stability at temperatures of about 20° C. to 30° C.

The organic solvent or the mixture of organic solvents used in the electrolyte according to the present teachings may have a melting point being below 0° C. and a boiling point above 100° C. Consequently, the electrolyte meets the requirements of its melting and boiling point because, as it is known, the melting point and boiling point of a solution is, respectively, below the melting point and above the boiling point of the solvent. This provides for a liquid state of the electrolyte that has a low viscosity and hence a high conductivity in a wide range of working temperatures.

In an exemplary implementation of the electrolyte, according to the present teachings, the mixture of organic solvents may include benzonitrile. The melting and boiling points of benzonitrile are about −13° C. and about 190° C., respectively. The melting and boiling points of an electrolyte based on benzonitrile would be, respectively, below and above those of benzonitrile.

In order to lower the working temperature of the electrolyte to at least −20° C., as may be required in cold environments, other nitrile derivatives were chosen as a co-solvent to benzonitrile. Said nitrile derivatives may be selected from the group comprising propionitrile, butyronitrile and 3-methoxy-propionitrile, which have melting points of −100° C. to −86° C., −112° C., and −63° C., respectively, and boiling points of 96° C. to 98° C., 117° C. to 119° C., and 164° C. to 165° C., respectively.

As a result of our numerous experiments with various organic solvents it has become evident that benzonitrile can be chosen as a major solvent component, while propionitrile, butyronitrile or 3-methoxypropionitrile may be chosen as co-solvents so as to prepare the mixture of organic solvents according to the present teachings. As it was revealed in our experiments, these organic solvents are chemically and electrochemically stable at high temperatures up to 100° C. and support a high working voltage of at least 2.7 V at this temperature, and at a ratio of benzonitrile to the co-solvent that may be between 97:3 and 70:30, by mass. In some exemplary embodiments, the ratio of benzonitrile to the co-solvent may be between 95:5 and 75:25, by mass.

In another aspect, the present teachings provide for an electrolyte of an electrochemical double-layer capacitor for applications at high temperatures up to 100° C., wherein the cations of the organic salts may be selected from the group of cations having a structure that includes: a) a central ionized nitrogen atom surrounded by four alkyl groups, wherein at least three of the alkyl groups have 4 carbon atoms; or b) a central ionized nitrogen atom that is a common element in 5- or 6-atom spiro-cyclic compounds.

On one hand, the molecular mass of the cations should not exceed 250 Daltons, so as to allow sufficient mobility for the cations. On the other hand, the central ionized nitrogen atom of the cations should be sufficiently protected by surrounding radicals against its reduction.

Our experiments mentioned herein have shown that such requirements are met if the cation of the organic salt is selected from the group including tetrabutylammonium (TBA), tributylmethylammonium (TBMA), 1,1'-spiro-bipyrrolidinium ($SBP_5$) and 1,1'-spiro-bipyridinium ($SBP_6$).

As was also shown in our experiments, the electrochemical stability of the electrolyte does not considerably depend on the anion. Therefore, the organic salts having cations selected as above may be selected from the group including tetrabutylammonium tetrafluoroborate ($TBABF_4$), 1,1'-spiro-bipyrrolidinium tetrafluoroborate ($SBP_5BF_4$), tributylmethylammonium bis(trifluoromethane)sulphonimide (TBMATFSI), and 1,1'-spiro-bipyridinium tetrafluoroborate ($SBP_6BF_4$), in any combination and weight ratio thereof.

In yet another aspect of the present teachings, the concentration of the organic salt or the combination of salts in the electrolyte may be between 15% and 35%, by mass, which does not affect the electrolyte properties mentioned above. In some exemplary embodiments, the concentration of the organic salt or the combination of salts in the electrolyte may be between 20% and 35%, by mass.

Figure 4:
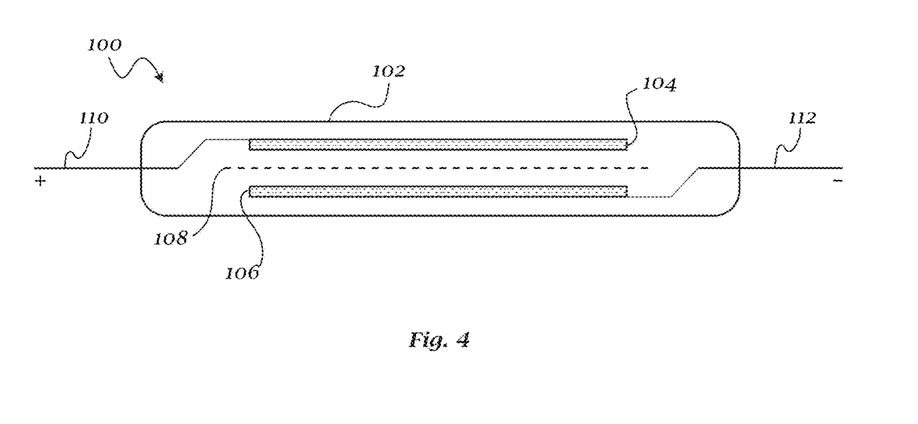
FIG. 4 illustrates an exemplary electrochemical double-layer capacitor for applications at temperatures up to 100° C.

In some aspects, as shown in FIG. 4, the present teachings provide for an electrochemical double-layer capacitor 100 for applications at high temperatures up to 100° C. The EDLC 100 can include a housing 102, a positive electrode 104 and a negative electrode 106. Housing 102 can be formed from, for example, aluminum foil laminated with a polymer. Each of electrodes 104, 106 can include a nanoporous carbon material and can be impregnated by an electrolyte. The electrodes 104, 106 are spaced by a separator 108. After impregnation of the electrodes with the electrolyte, the electrodes are sealed inside housing 102, such that only the positive and negative current leads 110, 112 that are coupled to the positive and negative electrodes 104, 106, respectively, protrude outside the housing. The electrolyte can include a solution of an organic salt or a combination of organic salts, with the salts including cations and anions. The electrolyte can have a melting point below 0° C., a boiling point above 100° C., electrochemical stability at a voltage of no less than 2.7 V at 100° C. and a viscosity below 2 mPa·s in the temperature range from about 0° C. to about 100° C.

Similarly to the electrolyte disclosed above, an organic solvent or a mixture of organic solvents of the EDLC electrolyte may have a melting point below 0° C. and a boiling point above 100° C., and may include benzonitrile as a single solvent or a basic solvent in a mixture with another nitrile derivative as a co-solvent. This another nitrile derivative may be selected from the group including propionitrile, butyronitrile and 3-methoxy-propionitrile, and the ratio between benzonitrile and the co-solvent may be between 97:3 and 70:30, by mass.

In one aspect, the EDLC 100 according to the present teaching may include the electrolyte, with the cations of the organic salts being selected from the group of cations having a structure that includes: a) a central ionized nitrogen atom surrounded by four alkyl groups, wherein at least three of the alkyl groups have 4 carbon atoms; or b) a central ionized nitrogen atom that is a common element in 5- or 6-atom spiro-cyclic compounds.

This requirement may be met by using the organic salt cations selected from the group including tetrabutylammonium (TBA), tributylmethylammonium (TBMA), 1,1'-spiro-bipyrrolidinium ($SBP_5$) and 1,1'-spiro-bipyridinium ($SBP_6$). Exemplary implementations of the salts having said cations, can include tetrabutylammonium tetrafluoroborate ($TBABF_4$), 1,1'-spiro-bipyrrolidinium tetrafluoroborate ($SBP_5BF_4$), tributylmethylammonium bis(trifluoromethane)sulphonimide (TBMATFSI), and 1,1'-spiro-bipyridinium tetrafluoroborate ($SBP_6BF_4$) in any combination and weight ratio thereof, wherein the concentration of the organic salt or combination of the salts in the electrolyte may be between 15% and 35%, by mass.

The implementation of the present teachings results in the following effect: an EDLC device, which includes the electrolyte prepared as described above, and demonstrates stable operation within the temperature range between −40° C. and +100° C. and voltages between 2.7 and 3.0 V. It is worth noting that at room temperature the performance of EDLC devices comprising the disclosed electrolytes is similar to that for the best commercially available EDLC devices but the operating voltage and temperature ranges are significantly extended.

The present teachings are illustrated in more detail through the Examples below. It should be understood, however, that the present teachings are not limited to the embodiments disclosed in the Examples but can as well be embodied in other electrolyte compositions and devices without departing from the scope and spirit of the present teachings.

EXAMPLE 1

Figure 1:
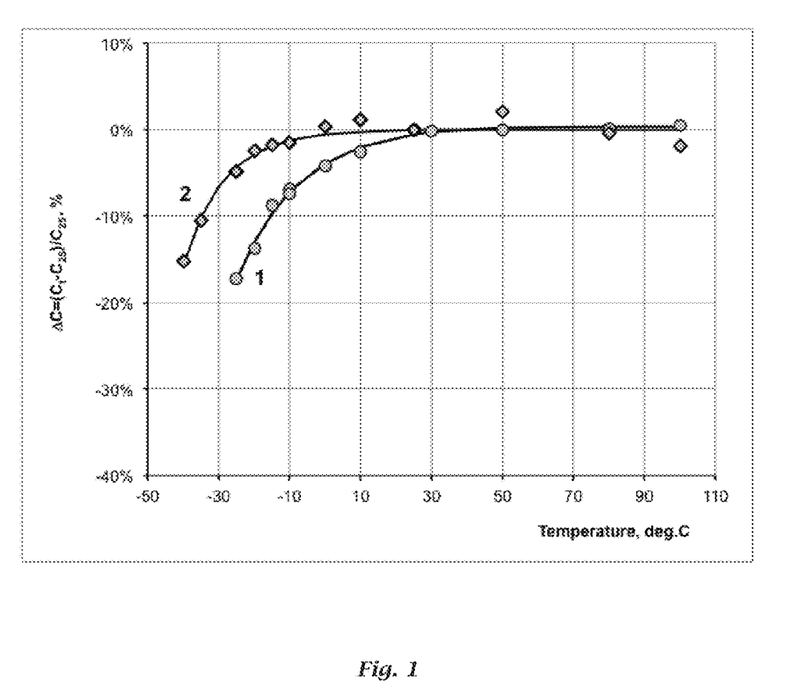
FIG. 1 illustrates a plot of capacitance vs. temperature for EDLC prototypes with benzonitrile (curve 1) or benzonitrile and propionitrile (curve 2) based electrolytes.
Figure 2:
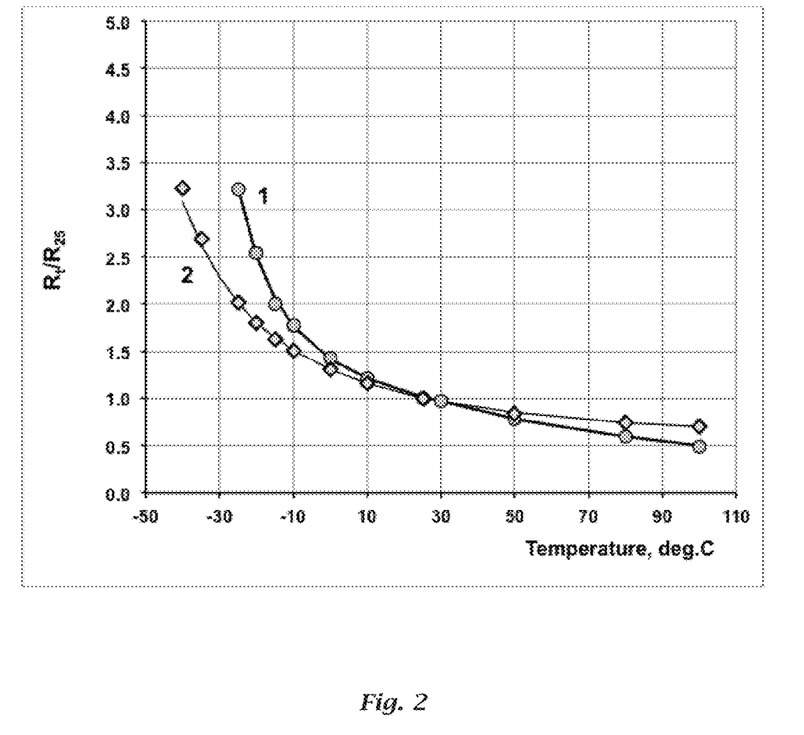
FIG. 2 illustrates a plot of resistance vs. temperature for EDLC prototypes with benzonitrile (curve 1) or benzonitrile and propionitrile (curve 2) based electrolytes.
Figure 3:
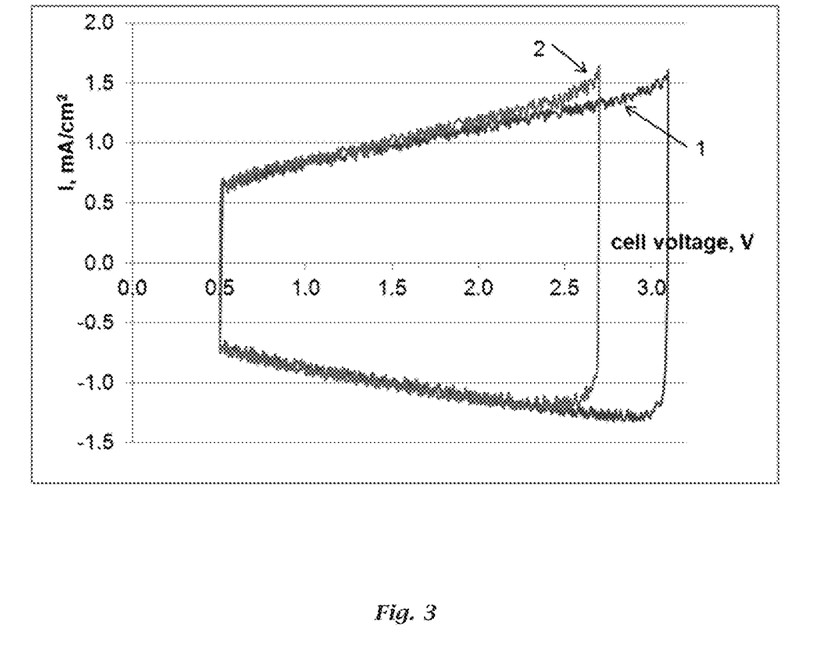
FIG. 3 illustrates cyclic voltammetry curves for benzonitrile based electrolyte at 25° C. (curve 1) and 100° C. (curve 2).

An electrolyte was prepared by dissolving 20 g of pre-dried spiro-bipyrrolidinium terafluoroborate ($SBP_5BF_4$) in 80 ml of dry benzonitrile so as to obtain a solution with a salt concentration of 20% by mass (or 1.2 mol/l). The moisture content in the obtained solution was measured as 9 ppm by Karl Fisher titration. The electrolyte thus prepared was used in EDLC prototypes containing two porous carbon electrodes applied on current collectors (20 micron thick Al foil), separated by a porous insulating film (the separator) and placed in a case made of laminated Al foil. The visible surface area of each active electrode layer was 15 $cm^2$. Six prototypes were thus fabricated, and FIG. 3 illustrates typical cycling voltammograms at 25° C. (curve 1) and 100° C. (curve 2). FIG. 1 (curve 1) illustrates the plot of EDLC prototype capacitance vs. temperature, and FIG. 2 (curve 1) illustrates the plot of EDLC prototype resistance vs. temperature. The capacitance and resistance values at 25° C. were chosen as reference points in the plots.

EXAMPLE 2

An electrolyte was prepared by dissolving 21.7 g of pre-dried spiro-bipyrrolidinium teraﬂuoroborate ($SBP_5BF_4$) in 81.8 ml of a mixture of benzonitrile and propionitrile (90:10, respectively, by mass) so as to obtain the ﬁnal salt concentration of 21.7% by mass (1.3 mol/l). The moisture content in the solution obtained was measured as 10 ppm by Karl Fisher titration. The electrolyte thus prepared was used and tested in EDLC prototypes fabricated as described in Example 1. Six prototypes were thus fabricated, and FIG. 1 (curve 2) illustrates the plot of typical EDLC prototype capacitance vs. temperature, while FIG. 2 (curve 2) illustrates the plot of EDLC prototype resistance vs. temperature. The capacitance and resistance values at 25° C. were chosen as reference points in the plots.

EXAMPLE 3

An electrolyte was prepared by dissolving a pre-dried mixture of 9.0 g of spiro-bipyrrolidinium teraﬂuoroborate ($SBP_5BF_4$) and 20.3 g of tributylmethylammonium bis (triﬂouromethane)sulphonamide (TBMATFSI) in 70.7 ml of dry benzonitrile. Total salt concentration thus was 29.3% by mass (or 1.2 mol/l). The moisture content in the solution obtained was measured as 12 ppm by Karl Fisher titration. The electrolyte thus prepared was used and tested in EDLC prototypes similar to that as described in Examples 1 and 2. The performance of this electrolyte in the temperature range between −25° C. and +100° C. practically coincides with that obtained for the electrolyte disclosed in Example 1, as shown in FIG. 1, curve 1 and also in FIG. 2, curve 1.

It was discovered that the EDLC prototypes using the electrolyte according to the present teachings demonstrate good electrochemical stability up to 100° C., as can be seen, e.g., from cyclic voltammetry curves in FIG. 3, which are close to a rectangular shape due to charge-discharge of the electric double layer but do not contain the waves responsible for any parasitic electrochemical (faradaic) processes.

As an unexpected result, the devices according to the present teachings may be used not only for higher temperature applications at about 2.7 V, but also for room temperature applications at about 3.0 V.

The foregoing description and accompanying ﬁgures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as deﬁned by the following claims.

What is claimed is:

1. An electrolyte for an electrochemical double-layer capacitor, comprising:
    a solution of an organic salt or a combination of organic salts, the salts consisting of cations and anions;
    wherein the electrolyte has a melting point below 0° C., a boiling point above 100° C., electrochemical stability at a voltage of no less than 2.7 V at 100° C., and viscosity below 2 mPa·s in the temperature range from 0° C. to 100° C.;
    wherein the organic salts comprise a single salt or a binary combination of salts; and
    the salts are selected from the group consisting of tetrabutylammonium tetraﬂuoroborate, 1,1'-spiro-bipyrrolidinium tetraﬂuoroborate, tributylmethylammonium bis (triﬂuoromethane)sulphonimide, and 1,1'-spiro-bipyridinium tetraﬂuoroborate.

2. The electrolyte according to claim 1, further comprising an organic solvent or a mixture of organic solvents, wherein the organic solvent or the mixture of organic solvents has a melting point below 0° C. and a boiling point above 100° C.

3. The electrolyte according to claim 2, wherein the organic solvent comprises benzonitrile.

4. The electrolyte according to claim 2, wherein the mixture of organic solvents comprises benzonitrile and a co-solvent, the co-solvent comprising another nitrile derivative.

5. The electrolyte according to claim 4, wherein the co-solvent is selected from the group consisting of propionitrile, butyronitrile and 3-methoxy-propionitrile.

6. The electrolyte according to claim 4, wherein the ratio of the benzonitrile to the co-solvent is between 97:3 and 70:30, by mass.

7. The electrolyte according to claim 1, wherein the cations of the organic salts are selected from the group of cations having a structure that includes:
    a central ionized nitrogen atom surrounded by four alkyl groups, wherein at least three of the alkyl groups have 4 carbon atoms; or
    a central ionized nitrogen atom that is a common element in 5- or 6-atom spiro-cyclic compounds.

8. The electrolyte according to claim 7, wherein the cations of the organic salts are selected from the group consisting of tetrabutylammonium, tributylmethylammonium, 1,1'-spiro-bipyrrolidinium and 1,1'-spiro-bipyridinium.

9. The electrolyte according to claim 1, wherein the concentration of the organic salt or the combination of salts in the electrolyte is between 15 and 35%, by mass.

10. An electrochemical double-layer capacitor, comprising:
    a housing;
    a positive electrode, sealed inside the housing, impregnated by an electrolyte and including a nanoporous carbon material;
    a negative electrode, sealed inside the housing, impregnated by the electrolyte and including a nanoporous carbon material; and
    a separator separating the positive electrode and the negative electrode;
    wherein the electrolyte comprises a solution of an organic salt or a combination of organic salts, the salts consisting of cations and anions;
    wherein the electrolyte has a melting point below 0° C., a boiling point above 100° C., electrochemical stability at a voltage of no less than 2.7 V at 100° C. and viscosity below 2 mPa·s in the temperature range from 0° C. to 100° C.; and
    wherein the organic salts comprise a single salt or a binary combination of salts; and
    the salts are selected from the group consisting of tetrabutylammonium tetraﬂuoroborate, 1,1'-spiro-bipyrrolidinium tetraﬂuoroborate, tributylmethylammonium bis (trifluoromethane)sulphonimide, and 1,1'-spiro-bipyridinium tetrafluoroborate.

11. The capacitor according to claim 10, wherein:
the electrolyte further comprises an organic solvent or a mixture of organic solvents; and
the organic solvent or the mixture of organic solvents has a melting point below 0° C. and a boiling point above 100° C.

12. The capacitor according to claim 11, wherein the organic solvent comprises benzonitrile.

13. The capacitor according to claim 11, wherein the mixture of organic solvents comprises benzonitrile and a co-solvent, the co-solvent comprising another nitrile derivative.

14. The capacitor according to claim 13, wherein the co-solvent is selected from the group consisting of propionitrile, butyronitrile and 3-methoxy-propionitrile.

15. The capacitor according to claim 13, wherein the ratio of the benzonitrile to the co-solvent is between 97:3 and 70:30, by mass.

16. The capacitor according to claim 10, wherein the cations of the organic salts are selected from the group of cations having a structure that includes:
a central ionized nitrogen atom surrounded by four alkyl groups, wherein at least three of the alkyl groups have 4 carbon atoms; or
a central ionized nitrogen atom that is a common element in 5- or 6-atom spiro-cyclic compounds.

17. The capacitor according to claim 16, wherein the cations of the organic salts are selected from the group consisting of tetrabutylammonium, tributylmethylammonium, 1,1'-spiro-bipyrrolidinium and 1,1'-spiro-bipyridinium.

18. The capacitor according to claim 10, wherein the concentration of the organic salt or the combination of salts in the electrolyte is between 15 and 35%, by mass.

* * * * *